United States Patent Office 2,820,182
Patented Jan. 14, 1958

2,820,182

PHOTOSENSITIVE RELAY CONTROL CIRCUIT

Charles F. Martin, Albuquerque, N. Mex., assignor, by mesne assignments, to the United States of America as represented by the United States Atomic Energy Commission Application September 28, 1955, Serial No. 537,308

2 Claims. (Cl. 317—130)

This invention relates generally to light-sensitive means for triggering the operation of any electronic device which is responsive to a positive or negative voltage input pulse.

More particularly, it is concerned with providing automatic means for generating and delivering a positive or negative voltage trigger pulse coincident with and in response to a prescribed course of travel of a moving light beam.

The field of light-sensitive devices is extremely broad; however, generally speaking, practical photocell applications may be divided into two groups: indicating quantitative measuring devices and control devices. It is the latter group with which we are concerned here. In this type of system a phototube must respond to a change in light intensity and operate a relay or tube by means of which other apparatus may be controlled.

In the photoelectric relay the light developed by the source is usually transmitted directly either to the photoelectric relay or to some surface such as a mirror and then reflected to the relay. The basic photoelectric unit consists of a phototube, an amplifier circuit and a relay, the contacts of which are used to control some electrical circuit.

With the above principles in mind it is now appropriate to outline briefly a known use of photoelectric control and to set forth the difficulty involved therewith. If we wish to count successive cycles of a damped harmonic oscillatory motion a light beam may be synchronized with such motion so that with each swing of the beam a photocell is energized. A pulse of voltage is thereby generated and may be amplified and used to operate an electronic counter, thus giving the desired indication; however, there is lacking in known devices any automatic means for initiating the counting process at the moment when the oscillator motion has decayed to a predetermined extent.

It is therefore an object of this invention to provide means responsive to the amplitude of travel of an oscillating light beam for triggering the operation of an electronic counter.

It will be understood by those skilled in the art that the device to be described can easily be adapted to control the operation of other and different electrical circuits. It is also not essential to this invention that the light beam have a true periodic motion.

It is therefore a further object of this invention to provide means for delivering a voltage pulse to any electronic circuit coincident with the attainment by a moving light beam of any predetermined path.

Other objects and advantages of the present invention will become apparent to those skilled in the art from the following description of the presently preferred embodiment taken in connection with the drawings made a part of this specification.

The present invention employs a group of light-sensitive relays to be operated sequentially in such a manner as to control the circumstances under which a voltage pulse from a photoelectric trigger source shall be accepted by an electrical circuit such as a counter.

For illustrative purposes only, the invention will be described in the context of equipment which is currently in use for performing moment-of-inertia measurements.

A practical method known to the prior art of determining the moment of inertia of an irregular test object is to compare its period of oscillation about a vertical axis with that of a standard calibrating billet of known moment of inertia. The moment of inertia of the test object may be calculated by means of the formula $$I_U = I_B (T_U/T_B)^2$$

where $I_U$ = the moment of inertia of the test object
$I_B$ = the moment of inertia of the billet (known)
$T_U$ = time for fixed number of swings of test object
$T_B$ = time of equal number of swings of billet It is apparent that the major source of error in the determination of $I_U$ will be in the measurement of $T_U$ and $T_B$. The chief difficulty lies in starting the counting and timing process. It is necessary to insure that both the standard billet and the test object will be initially subjected to the same angle of yaw since the restoring and damping forces must be the same for each series of oscillations.

Figure 1:
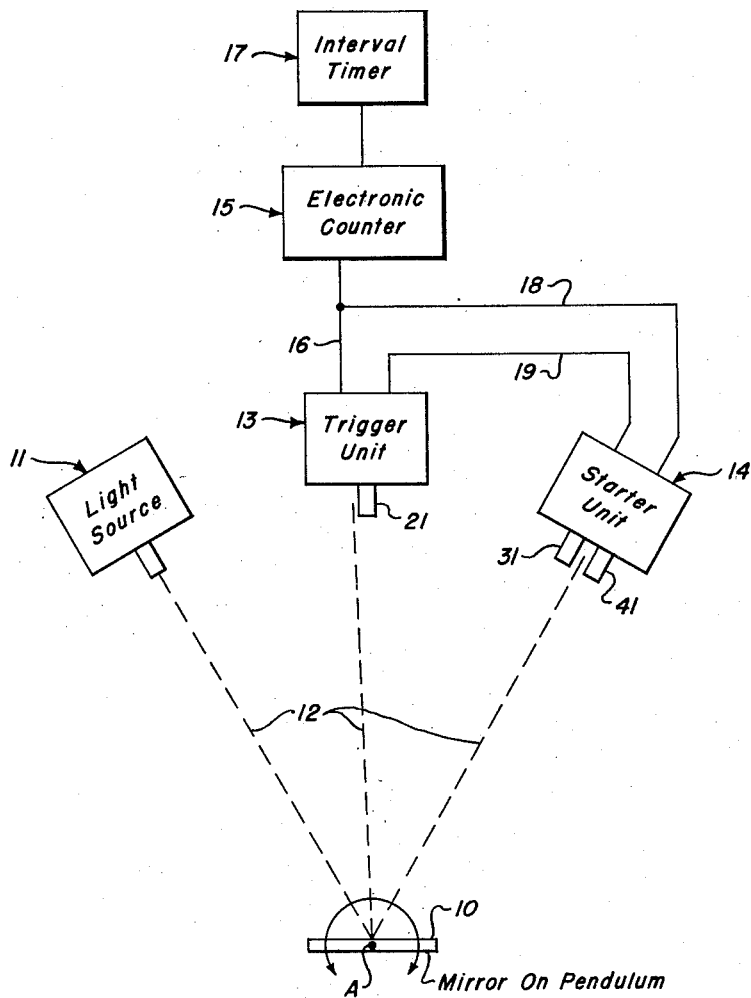
Fig. 1 is a block diagram of the electronic features of a torsional pendulum moment-of-inertia measuring system showing the starter and trigger units with which this invention is directly concerned.

Referring to Fig. 1, there is shown a block diagram of the system. A torsional pendulum bar (not shown) is supported vertically at point A and braced so that the bar will twist freely about its longitudinal axis while being denied any lateral motion. A billet (not shown) of known weight, dimensions and moment of inertia is suspended from the bar. Mirror 10 is rigidly connected to the torsional pendulum bar and rotates through the same angle and with the same angular velocity as the billet. A light source 11 transmits a light beam 12 to mirror 10 from an angle such that when the torsional pendulum bar is in a rest position the reflected beam 12 is displaced by a few degrees from trigger unit 13. Displaced from light source 11 at about 60 degrees relative to point A is a starter unit 14. Photocells 21, 31, and 41 are oriented so as to receive the reflected light beam 12 in sequence as the pendulum swings.

The pendulum is caused to yaw to an angle such that light beam 12 strikes both photocells 31 and 41. The pendulum is released and proceeds to execute a damped harmonic angular motion. A time is reached when the decay of the amplitude of oscillation of the billet will cause light beam 12 to strike photocell 31 and not photocell 41. As will be explained in connection with Fig. 2, the starter unit now places the previously inactive electronic counter 15 in a ready condition to start counting negative trigger pulses. Trigger unit 13 delivers such a pulse to counter 15 on trigger line 16 as the light beam 12 traverses photocell 21. Thus counter 15 begins to count the oscillations of the billet. On the first count a standard interval timer 17 is actuated. Counter 15 is adjusted to count only a predetermined number of negative pulses, and interval timer 17 is set to stop on the last pulse. This test may be repeated and an average time obtained for a given number of oscillations, say 10 or 20.

The procedure is then repeated with a test object substituted for the standard billet. The two average time intervals thus determined are applied to the formula set forth above as $T_B$ and $T_U$. Since $I_B$ is a known quantity, it is now possible to obtain a solution for $I_U$.

In the discussion that follows no values are prescribed for individual circuit elements. Those familiar with electronics will have no difficulty in selecting appropriate components.

Figure 2:
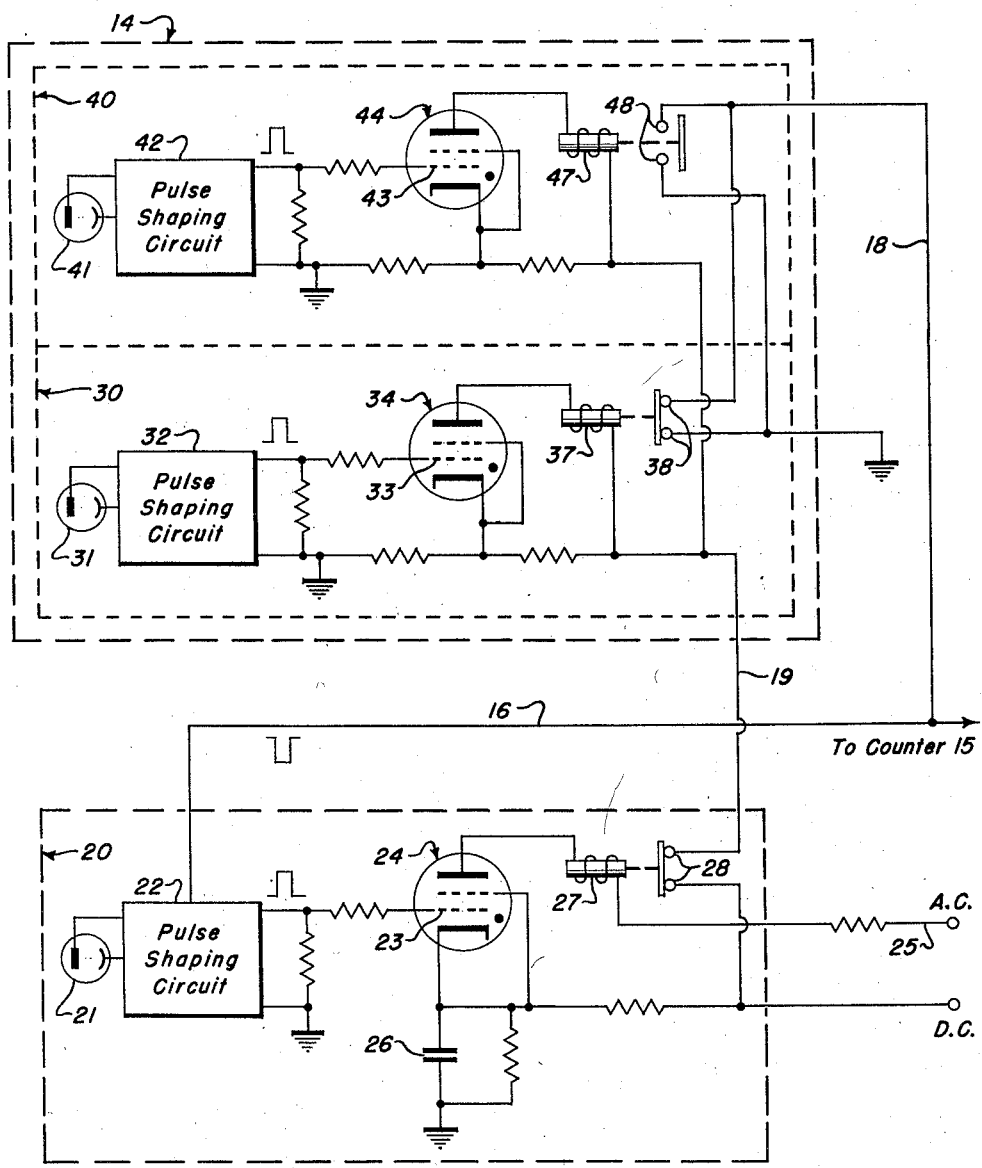
Fig. 2 is a circuit diagram of the novel relay system of this invention with connections to conventional elements shown in block form.

Fig. 2 sets forth in schematic form the novel features of this invention. Associated with the three relay circuits 20, 30 and 40, there are three photocells 21, 31 and 41, and pulse-shaping circuits 22, 32 and 42, the latter being shown in block form. These elements are conventional and form no part of the invention.

When the torsion pendulum bar is caused to yaw, light beam 12 of Fig. 1 strikes and activates photocell 21 of trigger relay circuit 20. Pulse-shaping circuit 22 provides a negative voltage pulse on trigger line 16, and a positive voltage pulse at grid 23 of thyratron 24. Thyratron 24 is provided with a low frequency alternating current plate supply on line 25 and will therefore conduct on the first positive half cycle after the trigger pulse appears on grid 23.

In order to open contacts 28 (whose function will be explained shortly), relay solenoid 27 must build up a sufficient flux. This requires a certain average value of current over a period of time depending upon the particular characteristics of these components. The trigger pulse on grid 23 must therefore be given a duration consistent with the above time requirement. On each negative half cycle of the alternating current plate supply, thyratron 24 deionizes and allows grid 23 to regain control. The trigger pulse will then cause the thyratron to conduct once more on the next positive half cycle.

When thyratron 24 conducts, cathode condenser 26 is charged to a higher value than during the initial non-conducting period. During subsequent non-conducting periods, this additional charge will not be completely dissipated with proper choice of resistance value in the discharge path. Therefore the value of current through solenoid 27 will increase with accumulated charge on condenser 26 so that an average current value of sufficient magnitude is provided.

After the trigger pulse on grid 23 has passed and contacts 28 have opened, thyratron 24 will be deionized and remain in that condition until the next positive trigger pulse appears. Also, contacts 28 will return to the normally closed position.

The negative pulse on trigger line 16 is seen at the input to electronic counter 15 (Fig. 1), but is shorted to ground through remote start line 18 and the closed relay contacts 38 of starter relay circuit 30. Therefore counter 15 will not as yet function. As light beam 12 continues to move in the same direction, it strikes and activates photocell 31. Pulse-shaping circuit 32 will co-operate to produce a positive pulse at grid 33 of thyratron 34. Thyratron 34 will fire, energizing solenoid 37 and opening normally closed contacts 38.

This process is duplicated in starter circuit 40 when light beam 12 strikes photocell 41. Photocell 41 and pulse-shaping circuit 42 generate a positive pulse at grid 43, firing thyratron 44 and closing the normally open relay contacts 48.

The pendulum bar will then reach the full extent of its swing and reverse direction. Light beam 12 will sweep past photocells 41 and 31, in that order, but this time there will be no further effect upon relay solenoids 37 and 47 and contacts 38 and 48, for as long as thyratrons 34 and 44 continue to receive a positive plate voltage, which is furnished on line 19, they will conduct independently of their grid potentials, once they have fired.

Light beam 12 continues now to photocell 21, sending another negative trigger pulse to counter 15. This pulse is again grounded through remote start line 18 and relay contacts 48. Also, in the manner described above, the contacts 28 will open and then re-close after the trigger pulse has passed. This removes the D. C. voltage from reset line 19, interrupting the plate supply to thyratrons 34 and 44. When these tubes cut off, the contacts 38 and 48 will return to their original positions, until such time as relay circuits 30 and 40 are again energized.

Light beam 12 will then reverse direction and re-cross photocell 21. Again, a negative pulse goes to counter circuit 15 on trigger line 16 and is shorted to ground on start line 18. Again, a positive pulse opens relay contacts 28. Interruption of the plate supply to thyratrons 34 and 44 will now have no effect, since these tubes are already non-conducting due to the previous interruption on reset line 19.

Light beam 12 continues to swing in this manner until such time as inherent damping forces cause it to pass photocell 31 and not photocell 41. When this happens in the manner explained above, contacts 38 will open and contacts 48 will remain open. When light beam 12 next swings past photocell 21 the negative pulse generated will start counter 15 (Fig. 1), since there is no longer any ground connection through remote start line 18. Thyratron 34 will once more be cut off by the operation of reset relay solenoid 27 and the ground will be restored through relay contacts 38, but counter 15 may be designed to function independently of this ground once it has been momentarily removed.

Counter 15 will now count any predetermined number of swings of the torsion pendulum bar, each swing giving rise to a negative voltage pulse as light beam 12 passes photocell 21 and these pulses may be automatically timed by interval timer 17 (Fig. 1).

Thus we see that the apparatus described provides an automatic counter start signal by discriminating between varying amplitudes of pendulum swing. By varying the physical separation of photocells 31 and 41, we may control the accuracy of this start signal in terms of pendulum position. Of course, it should be emphasized that this physical separation must be chosen with due regard to the degree of damping present in the oscillatory motion. That is, the decay of successive swings must be such that the light beam comes to rest at least once at some point in between photocells 31 and 41.

The circuit of this invention need not be limited to the particular use described. For example, it may be also employed as an indicating device. Suppose it is of interest to know whether the oscillations of a body are maintained at a constant amplitude within a certain tolerance. If we replace counter 15 with a recording circuit which indicates the presence of a voltage pulse only when its input is not grounded, we can make this determination. Only those oscillations whose maximum amplitude cause light beam 12 to fall between photocells 31 and 41 will produce voltage pulse indications corresponding to such oscillations. Variations in amplitude of oscillation causing the maximum values thereof to fall outside this area will prevent such indication.

Those skilled in the art will recognize many other situations to which this invention may be adapted without departing from the scope thereof as defined in the appended claims.

What is claimed is:

1. In cooperation with a system wherein a body executes damped harmonic oscillations, apparatus for triggering an electronic counter having a normally grounded input when said oscillations have decayed to a selected amplitude, comprising rotatable light beam projecting means adapted to sweep a light beam angularly along a plane path in accordance with the oscillations of the body, a first, a second, and a third photosensitive means spaced from the light beam projecting means in the order named along a generally arcuate path within the plane of said light beam, the first and second photosensitive means positioned to respond to two separate light beam positions representative respectively of oscillation amplitudes above and below the selected value by a predetermined amount, the third photosensitive means positioned closely adjacent the rest position of the light beam and energized by every oscillation thereof, a first normally open and a second normally closed switching means connected in parallel between the counter input and ground, said first and second switching means actuated by the operation of the first and second photosensitive means respectively, means including a DC power supply for thereafter holding said first and second switching means in an actuated condition independently of said first and second photosensitive means, a third normally closed switching means actuated by the operation of the third photosensitive means and adapted when actuated to interrupt said DC power supply, thereby resetting the first and second switching means to their normal positions, means for returning the third switching means to its normal position immediately after operation of the third photosensitive means, and means responsive to the third photosensitive means for delivering a voltage pulse to the recording circuit input.

2. In cooperation with a system wherein a body executed damped harmonic oscillations, apparatus for triggering an electronic counter having a normally grounded input when the oscillations have decayed to a selected amplitude, comprising rotatable light beam projecting means adapted to sweep a light beam angularly along a plane path in accordance with the oscillations of the body, a first, a second, and a third photosensitive means spaced from the light beam projecting means in the order named along a generally arcuate path within the plane of said light beam, the first and second photosensitive means positioned to respond to two separate light beam positions representative respectively of oscillation amplitudes above and below the selected value by a predetermined amount, the third photosensitive means positioned closely adjacent the rest position of the light beam and energized by every oscillation thereof, a first gas discharge tube rendered conductive by the operation of the first photosensitive means, a first pair of normally open relay contacts held closed during conduction of the first gas discharge tube, a second gas discharge tube rendered conductive by the operation of the second photosensitive means, a second pair of normally closed relay contacts held open during the conduction of the second gas discharge tube, said first and second gas discharge tubes having a DC plate supply, and said first and second pairs of relay contacts enabled to form parallel paths from the counter input to ground, a third gas discharge tube adapted to conduct momentarily by the operation of the third photosensitive means, a third pair of normally closed relay contacts held open during the momentary conduction of the third gas discharge tube, and said third pair of relay contacts being in series with the DC plate supply for the first and second gas discharge tubes, thereby resetting the first and second pairs of relay contacts when the third pair of contacts open, and means responsive to the third photosensitive means for delivering a voltage pulse to the recording circuit input.

References Cited in the file of this patent
UNITED STATES PATENTS

| | | |
|---|---|---|
| 2,336,376 | Tandler | Dec. 7, 1943 |
| 2,659,823 | Vossberg | Nov. 17, 1953 |

OTHER REFERENCES

"Electronics," December, 1950, pp. 74–77.